United States Patent
Kawaguchi et al.

(10) Patent No.: US 6,857,171 B2
(45) Date of Patent: Feb. 22, 2005

(54) METHOD FOR PRODUCING PLATE OF BATTERY

(75) Inventors: Nobuyuki Kawaguchi, Hadano (JP); Hitoshi Mikuriya, Chigasaki (JP); Yoshinori Itou, Odawara (JP); Hiromasa Nishijima, Fujisawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 268 days.

(21) Appl. No.: 10/203,036

(22) PCT Filed: Jul. 2, 2001

(86) PCT No.: PCT/JP01/05713

§ 371 (c)(1),
(2), (4) Date: Aug. 5, 2002

(87) PCT Pub. No.: WO02/03487

PCT Pub. Date: Jan. 10, 2002

(65) Prior Publication Data

US 2003/0024106 A1 Feb. 6, 2003

(30) Foreign Application Priority Data

Jul. 3, 2000 (JP) ........................................ 2000-200667

(51) Int. Cl.$^7$ ............................................... H01M 4/04
(52) U.S. Cl. ................................................. 29/2; 141/32
(58) Field of Search ............................... 429/218.2, 223, 429/235, 236, 237, 241; 29/2; 141/1.1, 32, 33

(56) References Cited

U.S. PATENT DOCUMENTS 5,727,604 A * 3/1998 Koike et al. .................. 141/1.1

FOREIGN PATENT DOCUMENTS

| EP | 0703632 | 3/1996 | ............ H01M/4/04 |
| JP | 3-037955 | 2/1991 | ............ H01M/2/08 |
| JP | 9-161792 | 6/1997 | ............ H01M/4/26 |
| JP | 9-106814 | 2/1998 | ............ H01M/4/64 |
| JP | 10-223219 | 8/1998 | ............ H01M/4/30 |

OTHER PUBLICATIONS

English translation of Japanese 9–161,792 (Jun. 1997).*

* cited by examiner

*Primary Examiner*—Stephen J. Kalafut
(74) *Attorney, Agent, or Firm*—Stevens, Davis, Miller & Mosher, LLP

(57) ABSTRACT

The method for producing plates for batteries according to the present invention comprises: allowing X-rays to penetrate through a supplied core material, thereby calculating the weight of the core material; filling the core material with an active material; then again allowing X-rays to penetrate through the core material, thereby calculating the weight of the filled active material and the core material; calculating the weight of the active material based on the difference in these weights measured; if this weight of the filled active material deviates from a given weight, adjusting the amount of the active material to be filled in the core material, thereby inhibiting variation in the amount of the filled active material; and then drying the core material filled with the active material to make an electrode plate.

8 Claims, 4 Drawing Sheets

US 6,857,171 B2

METHOD FOR PRODUCING PLATE OF BATTERY

TECHNICAL FIELD

The present invention relates to a method for producing an electrode plate for an alkaline storage battery.

BACKGROUND ART

Alkaline storage batteries such as nickel-metal hydride storage batteries, nickel cadmium storage batteries, etc. are superior in weight saving by miniaturization and widely used as electric sources of personal computers, portable telephones, etc.

In many cases, a plurality of these alkaline storage batteries are used in the form of battery packs, and the respective alkaline storage batteries are required to have a uniform charge and discharge capacity with no variation.

In order to make uniform the capacity of batteries, it is necessary that a positive electrode plate used in, for example, nickel-metal hydride storage batteries is constructed by filling a metallic porous body with a nickel hydroxide active material as uniform as possible. As specific methods for filling the metallic porous body with an active material, there have been a method of filling the metallic porous body with a pasty active material by jetting from a nozzle the pasty active material against one face toward another face of the metallic porous body in such a manner that the active material does not pierce through the metallic porous body, a method of filling the metallic porous body by dipping it in a pasty active material, etc. as disclosed in JP-A-9-106814, etc.

The metallic porous bodies filled with the active material are controlled with measuring the weight of the filled active material by penetrating a radiation such as β-rays through the metallic porous bodies as shown in FIG. 6.

DISCLOSURE OF INVENTION

According to the above methods, the weight of the active material is measured after drying the metallic porous body filled with the active material. This is because since there is no difference between the β-ray absorption coefficient of water and that of the active material, the amount of the filled active material cannot be measured accurately unless water is evaporated.

When the metallic porous body is filled with the active material and dried, and thereafter the amount of the filled active material is measured by penetration of radiation, a long time is required for completion of measurement, and the control of the filling amount is delayed, resulting in variation of the amount of the active material filled in the metallic porous body.

Furthermore, there is a problem that if space volume of the metallic porous body per se varies, this causes variation in filling of the active material.

The method for producing an electrode plate for batteries according to the present invention includes the following steps: X-rays are penetrated through a supplied core material, thereby to calculate the weight of the core material; this core material is filled with an active material; thereafter X-rays are again penetrated through the core material, thereby to calculate the weight of the filled active material and the core material; the weight of the active material is calculated from the difference in the weights measured above; when the weight of the filled active material deviates from a given weight, the amount of the active material to be filled in the core material is adjusted, thereby inhibiting occurrence of variation in the amount of the filled active material; and then the core material filled with the active material is dried to obtain an electrode plate.

According to the method of the present invention, amount of the filled active material is confirmed before drying and the filling amount can be rapidly controlled, and, hence, there can be provided an electrode plate for batteries less in occurrence of variation, namely, unevenness in the filled amount of the active material as compared with electrode plates made by conventional methods.

BEST MODE FOR CARRYING OUT THE INVENTION

Figure 1:
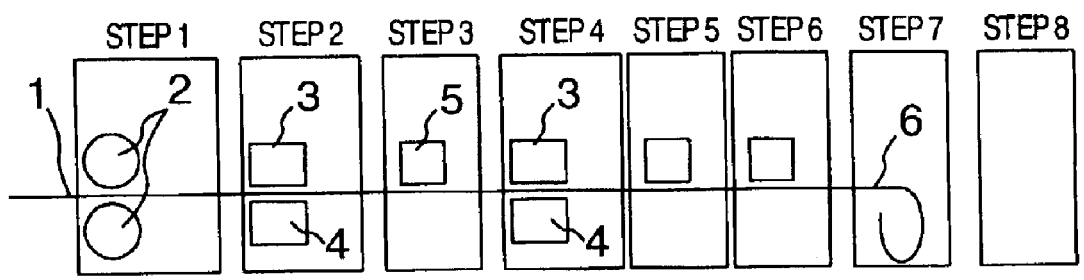
FIG. 1 schematically shows the production steps of the positive electrode plate for alkaline storage batteries according to the present invention.

The present invention is a method for producing an electrode plate for batteries which includes a supplying step of continuously supplying a core material; a weight-measuring step 1 of irradiating the core material with X-rays, measuring the penetration quantity of the X-rays and obtaining the weight of the core material per unit area based on the penetration quantity; a filling step of filling the core material with a given weight of an active material; a weight-measuring step 2 of irradiating with X-rays the core material filled with the active material, measuring the penetration quantity of the X-rays and obtaining the weight of the core material and the filled active material per unit area based on the penetration quantity; a weight-calculating step of calculating a difference between the weight value measured at the weight-measuring step 2 and the weight value measured at the weight-measuring step 1 to obtain the weight of the filled active material; a feedback controlling step of conducting a feedback control of the weight of the active material to be filled at the filling step in case the weight of the filled active material calculated at the weight-calculating step deviates from the permissible range of the given weight mentioned above, said feedback control being conducted based on the deviating weight of the active material; and a drying step of drying the filled active material.

The method of the present invention is characterized in that the weight is calculated based on the penetration quantity of X-rays. Since X-ray absorption coefficients of the core material and the active material greatly differ from the X-ray absorption coefficient of water (about 1/20), the weights of them can be accurately calculated without a drying step, being different from calculation of the weights using β-rays. Furthermore, since the weight of the filled active material can be confirmed just after the core material is filled with the active material, there is no time loss of drying, and control of the weight of the active material to be filled can be rapidly conducted. Therefore, there can be provided an electrode plate for batteries less in variation in the weight of the filled active material.

The core material is not especially limited as long as it can be used as a substrate of electrodes, and may have a shape of foil, sheet, perforated body, lath, porous body, or the like.

In the case of using a core material such as foil or sheet which is less in variation of weight, the above-mentioned step relating to calculation of weight of the core material may be omitted, and, specifically, an electrode plate for batteries which is less in variation of weight of the filled active material can also be provided by the method including a supplying step of continuously supplying a core material; a filling step of filling the core material with a given amount of an active material; a weight-calculating step of irradiating with X-rays the core material filled with the active material, measuring the penetration quantity of the X-rays and obtaining the weight of the filled core material per unit area based on the penetration quantity; and a feedback controlling step of conducting a feedback control of the weight of the active material to be filled at the filling step in case the weight of the filled active material calculated at the weight-calculating step deviates from the permissible range of the given weight mentioned above, said feedback control being conducted based on the deviating weight of the active material.

On the other hand, in the case of using a core material such as a perforated body or a porous body which is greater in variation of weight as compared with foil and sheet, it is preferred to carry out the above-mentioned steps relating to calculation of weight of the core material. Moreover, when a porous body is used as the core material, a step for reducing the variation in weight per se of the core material may be previously provided.

That is, the present invention further relates to a method for producing an electrode plate for batteries which includes a supplying step of continuously supplying a metallic porous body having a three-dimensionally communicating space; a thickness-adjusting step of adjusting the thickness of the metallic porous body; a weight-measuring step 1 of irradiating the metallic porous body with X-rays, measuring the penetration quantity of the X-rays and obtaining the weight of the metallic porous body per unit area based on the penetration quantity; a filling step of filling the metallic porous body with a given weight of an active material; a weight-measuring step 2 of irradiating with X-rays the metallic porous body filled with the active material, measuring the penetration quantity of the X-rays and obtaining the weight of the metallic porous body and the filled active material per unit area based on the penetration quantity; a weight-calculating step of calculating a difference between the weight measured at the weight-measuring step 2 and the weight measured at the weight-measuring step 1 to obtain the weight of the filled active material; a feedback controlling step of conducting a feedback control on the weight of the active material to be filled at the filling step in case the weight of the filled active material calculated at the weight-calculating step deviates from the permissible range of the given weight mentioned above, said feedback control being conducted based on the deviating weight of the active material; and a drying step of drying the filled active material.

The metallic porous body having a three-dimensionally communicating space is greater in space volume than the perforated metallic plate, and since this space volume has variation, it is effective to make the space volume uniform by adjusting the thickness before filling with the active material. If this step is added, variation in the amount of the active material filled in the metallic porous body can be further inhibited. The means for the adjustment of thickness is not limited, and it can be performed, for example, by pressing with rolls. The degree of pressing is optionally set depending on the physical properties of the metallic porous body.

Figure 4:
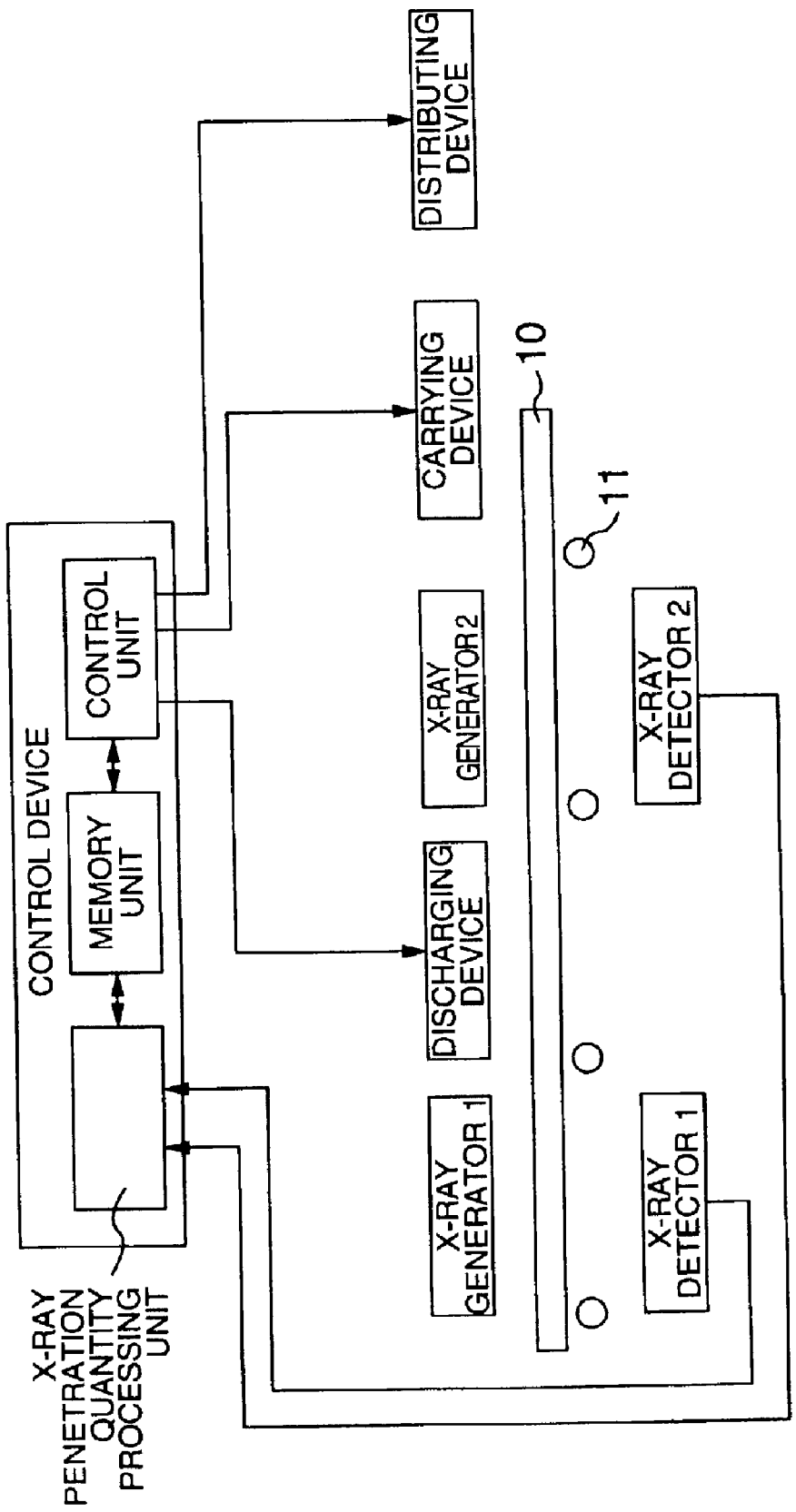
FIG. 4 is a schematic view of an apparatus for producing the electrode plate for batteries according to the present invention.

The method of the present invention mentioned above can be practiced, for example, by an apparatus for producing electrode plate for batteries as shown schematically in FIG. 4. Referring to FIG. 4, a core material 10 is carried by a carrying device such as rollers 11, and in the carrying route an X-ray generator 1 in an X-ray shield and an X-ray detector 1 opposing the X-ray generator 1, a discharging device such as a nozzle, an X-ray generator 2 in an X-ray shield and an X-ray detector 2 opposing the X-ray generator 2, and distributing device are disposed in series in this order.

First, the core material is irradiated with X-rays emitted from the X-ray generator 1, and a penetration quantity X1 of X-rays which have penetrated the core material is detected by the X-ray detector 1 and is input in an X-ray penetration quantity processing unit of the control device. Then, the core material is filled with an active material by the discharging device. Thereafter, the core material filled with the active material is irradiated with X-rays emitted from the X-ray generator 2, and a penetration quantity X2 of the X-rays which have penetrated the core material is detected by the X-ray detector 2 and is input in the X-ray penetration quantity processing unit of the control device.

The control device has an X-ray penetration quantity processing unit, a memory unit in which the data for calculation of weight and the data for inspection of weight are previously memorized, and a controlling unit. The X-ray penetration quantity processing unit first calculates the weight W1 of the core material based on the X-ray penetration quantity X1 using comparative quantity data D1 of the X-ray penetration quantity X1 and the weight W1 of the core material which are stored in the memory unit. The comparative quantity data D1 are prepared by previously obtaining a correlation on the X-ray penetration quantity and the weight of the core material with using the X-ray absorption coefficient as a variable.

Then, The X-ray penetration quantity processing unit calculates the weight W2 of the core material filled with the active material based on the X-ray penetration quantity X2 using comparative quantity data D2 of the X-ray penetration quantity X2 and the weight W2 of the core material filled with the active material which are stored in the memory unit.

Here, the comparative quantity data D2 are prepared by previously obtaining a correlation on the X-ray penetration quantity and the weight of the core material with using the X-ray absorption coefficient of the core material and the X-ray absorption coefficient of the active material as variables. As mentioned above, since the X-ray absorption coefficients of the core material and the active material greatly differs from that of water, the correlation can be obtained using the X-ray absorption coefficient of the core material and that of the active material as variables without using the X-ray absorption coefficient of water, but the X-ray absorption coefficient of water may also be used.

The amount W3 of the filled active material is calculated from the above obtained difference between W2 and W1, namely, W2−W1 and is sent to the memory unit. In the memory unit, a standard weight Wn of the active material and an optionally set permissible error range Dn are previously stored as data for weight inspection.

In the memory unit, the amount W3 of the filled active material is compared with the standard weight Wn and permissible error range Dn, and it is judged whether the W3 is within the permissible error range Dn in respect to the standard weight Wn or not, namely, whether the weight is permissible or impermissible. The results are output to the controlling unit.

When the controlling unit receives a control signal of the impermissible amount, it controls the discharging amount from the discharging device or the carrying speed of the carrying device to control the amount of the active material to be filled in the core material and to inhibit the variation of the amount of the filled active material.

The above apparatus may have a distribution device at its end portion, and the distribution device carries the article to a predetermined place as a normal article in case the weight is permissible, and if the weight is impermissible, the device carries the article to a predetermined place as an inferior article.

Furthermore, the above apparatus may be provided with a thickness-adjusting device such as rollers at the starting portion so as to reduce variation of the weight per se of the core material.

In the case of using a core material which is less in variation of weight, such as foil or sheet, control of the weight of the core material using the X-ray generator 1 and the X-ray detector 1 may be omitted, and the amount of the core material to be filled may be controlled using the weight of the core material filled with the core material.

EXAMPLE

The method for producing the electrode plate for alkaline storage batteries according to the present invention will be explained by the following examples.

Ten parts by weight of a nickel metal powder and 5 parts by weight of a cobalt oxide powder were added to 100 parts by weight of nickel hydroxide, followed by carrying out powder mixing. To the resulting mixture was added water as a dispersion medium so that the proportion of water in the whole paste was 25% by weight, and these were kneaded together to prepare an active material paste. The X-ray absorption coefficient of the active material paste was 16.45.

FIG. 1 schematically illustrates the steps for the production of a positive electrode plate for alkaline storage batteries according to one embodiment of the present invention. The details of the production steps will be explained below.

At the step 1 shown in FIG. 1, a strip-like spongy nickel metal porous body 1 of 3.0 mm in thickness, 98% in porosity and 200 $\mu$m in average pore diameter was passed between two thickness-adjusting rolls 2 made of iron to adjust the thickness to 2.5 mm.

Figure 2:
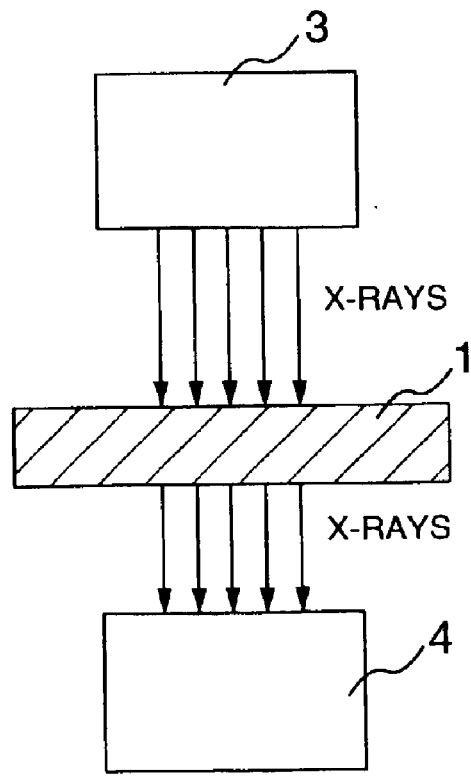
FIG. 2 schematically shows generation of X-rays.

At the step 2 shown in FIG. 1, as in FIG. 2 which schematically shows the generation of X-rays, X-rays were generated from an X-ray generator 3 (X-ray energy: 20 keV), the metallic porous body 1 was irradiated with the X-rays to allow the X-ray to penetrate through the porous body, the penetration quantity of the X-rays which penetrated the porous body was detected by a detector 4, and the weight of the metallic porous body 1 per unit area was calculated utilizing the X-ray absorption coefficient.

The calculation was conducted using a comparative quantity data showing the relation between the X-ray penetration quantity and the weight of the metallic porous body which was previously prepared as mentioned above.

Figure 3:
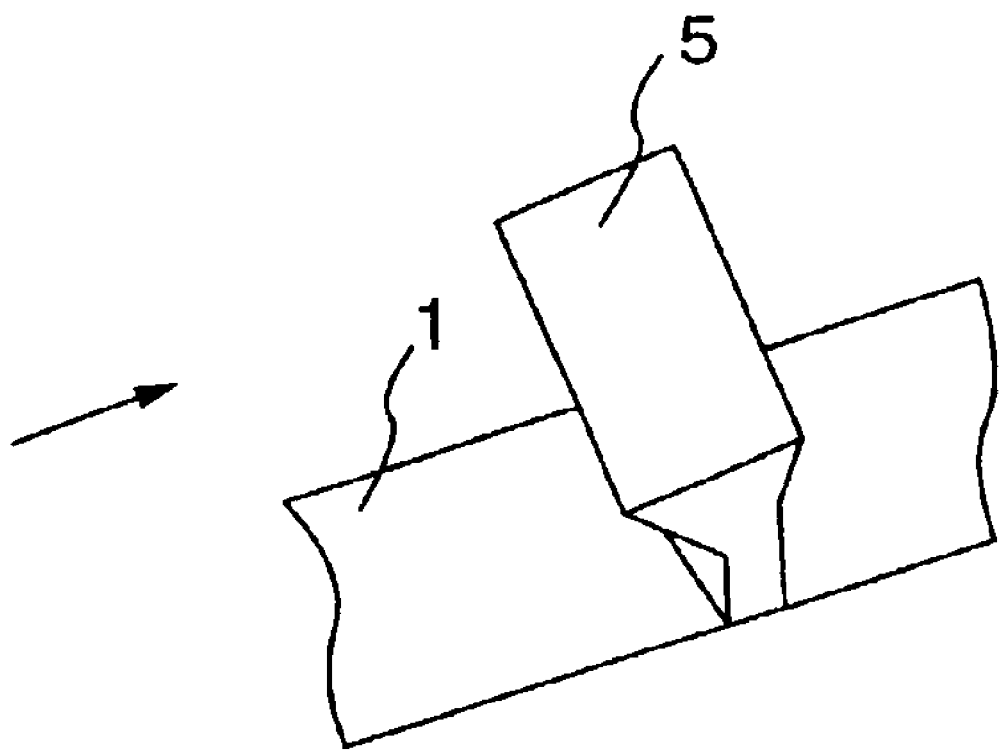
FIG. 3 schematically shows filling the metallic porous body 1 with an active material paste.

At the step 3 shown in FIG. 1, as in FIG. 3 which schematically shows filling of the metallic porous body 1 with the active material paste, a nozzle 5 was opposed to one side of the metallic porous body 1, and the metallic porous body 1 was filled with the active material paste using the nozzle 5 while the metallic porous body 1 per se was allowed to run in its long direction.

In this case, the distance between the nozzle 5 and the metallic porous body 1 was kept at 0.1 mm, and a constant amount of the pasty active material was discharged from the nozzle 5 to perform filling of the porous body with the pasty active material. At the filling of the porous body with the paste, the running speed of the porous body was adjusted so that the paste filled from the one side did not reach another side of the porous body, and, as a result, the running speed was preferably 7 m/min.

At the step 4 shown in FIG. 1, as shown in FIG. 2, X-rays were generated from the X-ray generator 3 and allowed to penetrate through the metallic porous body 1 filled with the active material paste, the X-ray which penetrated the porous body was detected by the detector 4, and the weight of the active material paste and the metallic porous body 1 per unit area was calculated utilizing the X-ray absorption coefficient as mentioned above. Since the X-ray absorption coefficient of water in the active material paste (X-ray absorption coefficient=0.692) was about $\frac{1}{20}$ of that of nickel hydroxide, amount of water can be ignored.

At the step 5 shown in FIG. 1, the weight of the active material paste per unit area was obtained from the difference between the weight of the active material paste and the metallic porous body 1 per unit area which was calculated at the step 4 and the weight of the metallic porous body 1 per unit area which was obtained at the step 2. In case this weight exceeded the given range of weight, a signal was given to the step 3 and feedback of the weight of the active material paste was conducted, whereby the amount of the active material paste to be filled was immediately adjusted.

At the step 6 shown in FIG. 1, the metallic porous body 1 filled with the active material paste was dried to obtain a positive electrode plate 6 in the example of the present invention. The positive electrode plate 6 was taken up at the step 7, and the positive electrode plate 6 fitted to the size of batteries was produced at the step 8.

In this example, the positive electrode plate 6 was roll pressed to a thickness of 0.8 mm, and cut to 110 mm in length and 60 mm in width which was the size of positive electrode plate for A size of alkaline storage batteries. In this way, 10000 electrode plates were produced.

COMPARATIVE EXAMPLE

Next, a comparative example will be shown below.

An active material paste having the same composition as in Example and the same metallic porous body 1 as in Example were used.

Figure 5:
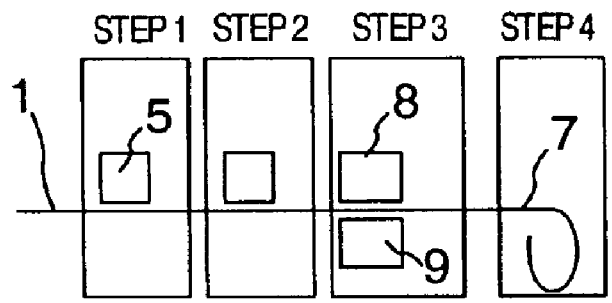
FIG. 5 schematically shows the production steps of the positive electrode plate for alkaline storage batteries according to comparative example.

FIG. 5 schematically illustrates the steps for production of a positive electrode plate for alkaline storage batteries according to comparative example. The details of the production steps will be explained below.

At the step 1 shown in FIG. 5, a nozzle 5 was opposed to one side of a strip-like spongy nickel metal porous body 1 of 3.0 mm in thickness, 98% in porosity and 200 $\mu$m in average pore diameter, and using this nozzle 5, the metallic porous body 1 was filled with the active material paste while the metallic porous body 1 per se was allowed to run in its long direction in the same manner as in Example. The porous body was dried at the step 2 to obtain a positive electrode plate 7 of comparative example.

Figure 6:
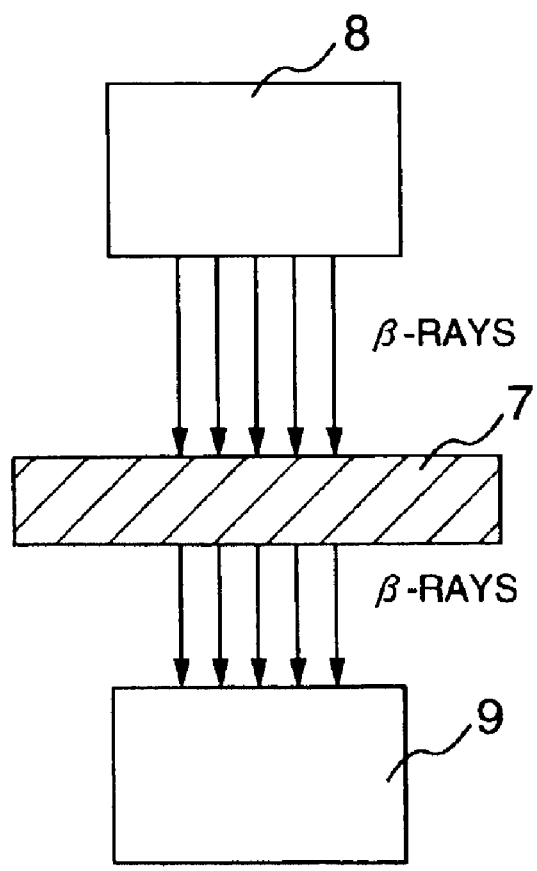
FIG. 6 schematically shows generation of β-rays.

At the step 3 shown in FIG. 5, as in FIG. 6 which schematically shows the generation of β-rays, β-rays were generated from a β-ray generator 8 and were allowed to penetrate the metallic porous body 1 filled with the active material paste, and the β-ray which penetrated the porous body was detected by a β-ray detector 9. The weight of the active material paste and the metallic porous body 1 per unit area was calculated utilizing the β-ray absorption coefficient, and from the resulting weight was subtracted the weight of the metallic porous body 1 per unit area to obtain the weight of the active material paste. The positive electrode plate 8 was taken up at the step 4.

Here, the weight of the positive electrode plate 7 was measured by irradiation with β-rays after drying the positive electrode plate 7. This is because the difference between the β-ray absorption coefficient of water and that of nickel hydroxide is small and cannot be distinguished from each other.

Furthermore, the weight of the active material paste per unit area was based on the standard value, assuming that there was no variation in the weight of the metallic porous body 1.

The positive electrode plate 7 obtained above was roll pressed to a thickness of 0.8 mm, and cut to 110 mm in length and 60 mm in width which was a size of positive electrode plate for A size of alkaline storage batteries. In this way, 10000 electrode plates were produced.

Then, 100 plates were extracted from the positive electrode plates 6 and the positive electrode plates 7, respectively, and the weight of the filled active material paste was measured. The variation in weight is shown in Table 1.

TABLE 1

|  | Positive electrode plate of Example | Positive electrode plate of Comparative Example |
| --- | --- | --- |
| Variation in weight | ±1.66% | ±3.32% |

As shown in Table 1, the variation in weight of the filled active material paste was ±1.66% in Example while that of the filled active material paste in Comparative Example was ±3.32%.

This is because in the Example, since X-rays were utilized, the amount of the filled active material paste could be measured without drying the positive electrode plates 6 and, besides, the amount of the filled active material paste could be measured upon carrying out immediate feedback of the measured amount. Furthermore, in the Example, the weight of the metallic porous body 1 was measured, the weight of the positive electrode plate 6 was measured after filling the metallic porous body 1 with the active material paste, and the weight of the active material paste was accurately measured by subtracting the weight of the metallic porous body 1 from the weight of the positive electrode plate 6.

On the other hand, in the Comparative Example, after drying the positive electrode plate 7, the weight of the active material paste and that of the metallic porous body 1 were measured utilizing β-rays, and the weight of the active material paste was calculated. Therefore, the weight of the active material paste could not be directly measured. Moreover, since the weight of the positive electrode plate was measured after drying, feedback to the filling step cannot be carried out quickly even if variation in weight becomes great, and thus the variation became great.

The above Example shows a method of producing a positive electrode plate comprising a metallic porous body filled with an active material paste, but this can be applied to a method of production by coating a punching metal with a hydrogen-storing alloy.

When alkaline storage batteries such as nickel-metal hydride storage batteries and nickel cadmium storage batteries are made using the positive and negative electrode plates produced by these methods, high capacity alkaline storage batteries less in variation of battery capacity can be constructed.

In the above Example, a method of controlling the filling amount using X-rays was used in filling a metallic porous body with an active material paste from one side toward another side of the metallic porous body, and this method of controlling the filling amount using X-rays can also be used in constructing an electrode by dipping a metallic porous body in an active material paste to fill the porous body with the paste or by coating a punching metal with an active material paste or a hydrogen-storing alloy paste.

Furthermore, the core material such as the punching metal is not required to be adjusted in its thickness different from the metallic porous body which is required to be adjusted in its thickness.

INDUSTRIAL APPLICABILITY

As explained above, according to the present invention, electrodes less in variation of the filled amount of the active material can be constructed. Moreover, when the electrodes are used for batteries, excellent batteries less in variation of charge and discharge capacity can be constructed.

What is claimed:

1. A method for producing a electrode plate for batteries, the method comprising:

continuously supplying a core material;

irradiating the core material with X-rays, measuring a penetration quantity of the X-rays and obtaining a first weight of the core material per unit area based on the penetration quantity;

filling the core material with a given weight of an active material;

irradiating with X-rays the core material filled with the active material, measuring a penetration quantity of the X-rays and obtaining a second weight of the core material and the filled active material per unit area based on the penetration quantity;

calculating a difference between the second and first weight values to obtain the measured weight of the filled active material;

conducting a feedback control of the weight of the active material to be filled into the core material when the measured weight of the filled active material deviates from a permissible range of the given weight said feedback control being conducted on the basis of the deviating weight of the active material; and drying the filled active material.

2. A method for producing an electrode plate for batteries according to claim 1, wherein the active material is a paste mainly composed of nickel hydroxide or a hydrogenstoring alloy paste.

3. A method for producing an electrode plate for batteries according to claim 1, wherein the core material is a perforated metal plate.

4. A method for producing an electrode plate for batteries, the method comprising:
continuously supplying a metallic porous body having a three-dimensionally communicating space;
adjusting the thickness of the metallic porous body;
irradiating the metallic porous body with X-rays, measuring a penetration quantity of he X-rays and obtaining a first weight of the metallic porous body per unit area based on the penetration quantity;
filling the metallic porous body with a given weight of an active material;
irradiating with X-rays the metallic porous body filled with the active material, measuring a penetration quantity of the X-ray and obtaining a second weight of the metallic porous body and the filled active material per unit area based on the penetration quantity;
calculating a difference between the second and first weights to obtain a measured weight of the filled active material;
conducting a feedback control of the weight of the active material to be filled into the metallic porous body when the measured weight of the filled active material deviates from a permissible range of the given weight, said feedback control being conducted on the basis of the deviating weight of the active material; and
drying the filled active material.

5. A method for producing an electrode plate for batteries according to claim 3, wherein the active material is a paste mainly composed of nickel hydroxide or a hydrogen-storing alloy paste.

6. An apparatus for producing an electrode, the apparatus comprising:

a first X-ray generating means for generating rays and a first X-ray detecting means for measuring a penetration quantity of the X-rays generated by the first X-ray generating means which penetrate a core material;
an active material filling means for filling the core material with an active material;
a second X-ray generating means for generating X-rays and a second X-ray detecting means for measuring a penetration quantity of the X-rays generated by the second X-ray generating means which penetrate the core material filled with the active material;
an X-ray penetration quantity processing means for judging whether the weight of the filled active material is permissible or impermissible, by calculating an amount of the filled active material based on the penetration quantity of the X-rays which penetrate the core material prior to being filled with the active material and the penetration quantity of the X-rays which penetrate the core material filled with the active material; and
a controlling means for controlling a filling amount of the active material based on a signal indicating the impermissible amount.

7. An apparatus according to claim 6 further comprising a distributing means for separating a core material judged to be impermissible, based on a measured amount of filled active material, from another core material judged to be permissible, based on a measured amount of filled active material.

8. An apparatus according to claim 6 further comprising a means for adjusting the thickness of the core material.

* * * * *